United States Patent Office 3,297,770
Patented Jan. 10, 1967

3,297,770
PRODUCTION OF HALOGENONAPHTHALENES
William Cummings, Marford, Wales, assignor to Monsanto Chemicals Limited, London, England, a British company
No Drawing. Filed Aug. 29, 1963, Ser. No. 305,517
Claims priority, application Great Britain, Sept. 7, 1962, 34,286/62
5 Claims. (Cl. 260—650)

This invention relates to a new process for the production of halogenonaphthalenes.

The halogenonaphthalenes have a variety of uses, and, by the present process, they are obtained substantially free from impurities and in high yields. The process is particularly valuable for the production of isomers that are not readily accessible by conventional syntheses.

The process of the invention is one for the production of a halogenonaphthalene, in which a naphthalene sulfonyl halide is contacted with a sulfuryl halide and a compound which, under the reaction conditions, is a source of free radicals, such that sulfur dioxide is eliminated from a sulfonyl halide group of the naphthalene sulfonyl halide, and the halogen atom of the sulfonyl halide group is introduced into the naphthalene nucleus.

The compound that is a source of free radicals is preferably a peroxide such as, for instance, benzoyl peroxide.

The quantity of sulfuryl halide employed is generally less than the molar equivalent of the sulfonyl halide, while the compound that is a source of free radicals is normally required in only a catalytic amount.

Usually the process is conducted at a temperature above ambient temperature but lower than the temperature at which the naphthalene sulfonyl halide would itself decompose thermally. A temperature in the range of 30–150° C. is often suitable, for instance, in the range of 50–120° C.

By using the appropriate sulfonyl halide, the required halogenonaphthalene can be produced; for instance, a naphthalene sulfonyl chloride gives a chloronaphthalene, and a naphthalene sulfonyl bromide gives a bromonaphthalene. Because of the generally greater stability of the aromatic sulfonyl fluorides, and the ease with which the aromatic sulfonyl iodides split out iodine, the process tends to be somewhat less effective for the production of fluoronaphthalenes and iodonaphthalenes than for the production of chloronaphthalenes and bromonaphthalenes.

A mono-, di-, tri- or other halogenonaphthalene can be obtained by the use of a mono-, di-, tri- or other appropriate naphthalene sulfonyl halide. The process is particularly useful in the production of dihalogenonaphthalenes from naphthalene disulfonyl halides.

The process can also be applied to naphthalene sulfonyl halides containing a substituent in the naphthalene nucleus other than the sulfonyl halide group, and which is carried through to the product. Such a substituent can be a halogen atom, for instance fluorine, chlorine or bromine; an aliphatic group, for example an alkyl or cycloalkyl group such as a methyl, ethyl or cyclohexyl group, or an alkoxy group such as a methoxy or ethoxy group; an aromatic group, for example an aryl or aryloxy group, such as a phenyl, tolyl or phenoxy group; or a nitro group.

It is generally desirable that the halogen of the sulfuryl halide be the same as the halogen of the sulfonyl halide group or groups in the naphthalene sulfonyl halide. For example, sulfuryl chloride is usually employed with a naphthalene sulfonyl chloride, and sulfuryl bromide with a naphthalene sulfonyl bromide.

Specific examples of halogenonaphthalenes that can be produced by the process of the invention are 1-chloronaphthalene; 2-bromonaphthalene; 1,5-dichloronaphthalene; 2,7-dichloronaphthalene; 1,5-dibromonaphthalene; 2,7-dibromonaphthalene; 1,5-dichloro-3-nitronaphthalene; 2,7-dichloro - 1 - methylnaphthalene; and 1,5,7-trichloronaphthalene.

Preferably, the process is carried out in the presence of a solvent, especially one that is substantially inert to free radicals under the reaction conditions. Good results are obtained using, for example, halogenated aliphatic hydrocarbons in which all or most of the hydrogen atoms have been replaced by halogen (e.g., carbon tetrachloride and carbon tetrabromide).

It is usually possible to select a solvent having a boiling point such that the reaction can be carried out at atmospheric pressure. The process can be conducted at an elevated pressure (in the presence or absence of the solvent) should this be necessary.

Usually it is sufficient to use not more than about 0.3 mol of the sulfuryl halide per mol of the sulfonyl halide (or per sulfonyl halide group where the sulfonyl halide is a polysulfonyl halide), and good results are obtained using, for example, 0.1 or 0.05 mol of sulfuryl halide for each sulfonyl halide group present per mol of the sulfonyl halide.

The compound that is a source of free radicals can, for example, be an azo or diazonium compound, but is preferably a peroxide or hydroperoxide such as hydrogen peroxide, tertiarybutyl hydroperoxide, cumyl hydroperoxide or benzyl peroxide. The last named gives very good results.

The quantity of the compound that is a source of free radicals need not normally exceed about one-tenth of the molar equivalent of the sulfuryl halide, from about one-fiftieth to about one-twentieth of the molar equivalent of the sulfuryl halide being usually sufficient.

The invention is illustrated by the following examples.

Example 1

This example describes the production of 1,5-dichloronaphthalene.

A stirred mixture of 460 grams (1.42 mol) of naphthalene-1,5-disulfonyl chloride, 23 cc. (0.28 mol) of sulfuryl chloride, and 4.6 grams (0.019 mol) of benzoyl peroxide in 2 liters of carbon tetrachloride is heated to boiling under reflux for 6¾ hours. Sulfur dioxide is evolved. Much of the sulfonyl chloride is present initially as a suspension, but complete solution occurs after 3 hours. The final solution is filtered while hot to remove a small amount of insoluble material, and the carbon tetrachloride is distilled from the filtrate. Crystallization of the residue from ethanol gives 256 grams (92% of the theoretical yield) of 1,5-dichloronaphthalene as colorless crystals having a melting point of 106–108° C.

Example 2

2,7-dichloronaphthalene is obtained as crystals having a melting point of 113–116° C. in 90% of the theoretical yield by essentially the same procedure as described in Example 1. The starting materials employed are 476 grams (1.47 mol) of naphthalene-2,7-disulfonyl chloride, 24 cc. (0.3 mol) of sulfuryl chloride and 4.8 grams (0.02 mol) of benzoyl peroxide.

Following the procedure described in Example 1, the following naphthalene sulfonyl halides (a) are employed to yield the halogenonaphthalenes (b) indicated. It will be understood that the appropriate sulfuryl halide is also employed as a starting material.

Example 3
(a) 2-chloro-1-naphthalene sulfonyl chloride
(b) 1,2-dichloronaphthalene

Example 4
(a) 8-nitro-1-naphthalene sulfonyl chloride
(b) 1-chloro-8-nitronaphthalene

Example 5
(a) 7-methyl-1-naphthalene sulfonyl chloride
(b) 1-chloro-7-methylnaphthalene

Example 6
(a) 2-isopropyl-1-naphthalene sulfonyl chloride
(b) 1-chloro-2-isopropylnaphthalene

Example 7
(a) 3,7-di-*t*-butyl-1-naphthalene sulfonyl chloride
(b) 1-chloro-3,7-di-*t*-butylnaphthalene

Example 8
(a) 4,5-dinitro-1-naphthalene sulfonyl chloride
(b) 1-chloro-4,5-dinitronaphthalene

Example 9
(a) 4-chloro-3-nitro-1-naphthalene sulfonyl chloride
(b) 1,4-dichloro-3-nitronaphthalene

Example 10
(a) 4-methoxy-3-methyl-1-naphthalene sulfonyl chloride
(b) 1-chloro-4-methoxy-3-methylnaphthalene

Example 11
(a) 3,6-dichloro-2-naphthalene sulfonyl chloride
(b) 2,3,6-trichloronaphthalene

Example 12
(a) 4,7-diisopropyl-2-naphthalene sulfonyl chloride
(b) 2-chloro-4,7-diisopropylnaphthalene

Example 13
(a) 6-ethyl-2-naphthalene sulfonyl chloride
(b) 2-chloro-6-ethylnaphthalene

Example 14
(a) 3-methoxy-2-naphthalene sulfonyl chloride
(b) 2-chloro-3-methoxynaphthalene

Example 15
(a) 2-naphthalene sulfonyl bromide
(b) 2-bromonaphthalene

Example 16
(a) 1-naphthalene sulfonyl fluoride
(b) 1-fluoronaphthalene

Example 17
(a) 1,6-naphthalene disulfonyl chloride
(b) 1,6-dichloronaphthalene

Example 18
(a) 6-chloro-1,3-naphthalene disulfonyl chloride
(b) 1,3,6-trichloronaphthalene

Example 19
(a) 4-nitro-1,5-naphthalene disulfonyl chloride
(b) 1,5-dichloro-4-nitronaphthalene

Example 20
(a) 1,3,7-naphthalene trisulfonyl chloride
(b) 1,3,7-trichloronaphthalene While the invention has been described herein with regard to several specific embodiments, it is not so limited. It is to be understood that modifications and variations of the invention, obvious to those skilled in the art, may be made without departing from the spirit and scope of said invention.

What is claimed is:

1. A process for preparing a compound of the formula,

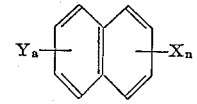

wherein a is an integer from 0 to 3, n is an integer from 1 to 3, X is halogen, and Y is selected from the group consisting of halogen, nitro, lower alkyl and lower alkoxy, which comprises contacting, at a temperature of from about 30° C. to about 150° C., a naphthalene sulfonyl halide of the formula,

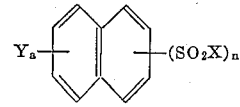

with a sulfuryl halide of the formula

wherein *a*, *n*, X and Y have the same meaning as above, and wherein Z represents the same halogen as X, in the presence of a material selected from the group consisting of peroxides and hydroperoxides, the amount of sulfuryl halide employed per mol of naphthalene sulfonyl halide being up to 0.3 mol per sulfonyl halide group.

2. A process as defined in claim 1 wherein said naphthalene sulfonyl halide is a naphthalene disulfonyl halide.

3. A process as defined in claim 1 wherein a is zero.

4. A process as defined in claim 1 wherein said material is benzoyl peroxide.

5. A process as defined in claim 1 wherein X and Z have an atomic number of up to 35.

References Cited by the Examiner
UNITED STATES PATENTS

| | | |
|---|---|---|
| 1,183,094 | 5/1916 | Mann et al. |
| 2,852,565 | 9/1958 | Nozaki _____ 260—651 X |
| 3,230,268 | 1/1966 | Kobayashi et al _____ 260—651 |

FOREIGN PATENTS

| | | |
|---|---|---|
| 98,433 | 12/1966 | Germany. |
| 13,971 | 9/1962 | Japan. |

OTHER REFERENCES

Kroepelin et al.: Ang Chemie, vol. 64 (1952), pp. 273–274.

Gilman: "Organic Chemistry," vol. I, p. 900 (1958).

Groggins: Unit Processes in Organic Synthesis, 4th ed. (1952), p. 227.

LEON ZITVER, *Primary Examiner.*

K. H. JOHNSON, K. V. ROCKEY, *Assistant Examiners.*